United States Patent [19]

Berner

[11] Patent Number: 5,421,597

[45] Date of Patent: *Jun. 6, 1995

[54] CONVERTIBLE INFANT STROLLER AND TRAILER WITH QUICK RELEASE HITCH

[75] Inventor: John M. Berner, Golden Valley, Minn.

[73] Assignee: TRI Industries, Inc., Bloomington, Minn.

[*] Notice: The portion of the term of this patent subsequent to Jun. 7, 2011 has been disclaimed.

[21] Appl. No.: 153,433

[22] Filed: Nov. 16, 1993

Related U.S. Application Data

[63] Continuation-in-part of Ser. No. 102,088, Aug. 4, 1993, Pat. No. 5,318,318, which is a continuation of Ser. No. 992,830, Dec. 18, 1992, Pat. No. 5,259,634.

[51] Int. Cl.[6] .................................................. B62K 27/12
[52] U.S. Cl. ................................. 280/204; 280/415.1; 280/648
[58] Field of Search ............... 280/202, 204, 62, 415.1, 280/47.38, 47.4, 287, 648, 650, 656, 657, 658

[56] References Cited

U.S. PATENT DOCUMENTS

| D. 204,254 | 5/1966 | Cerf . |
| D. 206,116 | 11/1966 | Hughes . |
| D. 274,714 | 7/1984 | Cone . |
| D. 290,825 | 4/1987 | Mathies et al. . |
| D. 297,525 | 9/1988 | Baechler . |
| D. 301,850 | 5/1989 | Clement et al. . |
| D. 315,885 | 4/1991 | Jacobs . |
| 699,186 | 5/1902 | Katzke . |
| 716,972 | 12/1902 | Whitmore . |
| 2,425,688 | 8/1947 | Schulte . |
| 2,455,119 | 11/1948 | Hall . |
| 2,781,225 | 2/1957 | Heideman . |
| 3,052,480 | 9/1962 | Sanstrom . |
| 3,110,504 | 12/1963 | Myers . |
| 3,305,244 | 2/1967 | Flagg . |
| 3,403,744 | 10/1968 | Dinkel . |
| 3,575,461 | 4/1971 | Goldman et al. . |
| 3,605,929 | 9/1971 | Rolland . |
| 3,656,777 | 4/1972 | Keiser, Jr. . |
| 3,698,502 | 10/1972 | Patin . |
| 3,712,636 | 1/1973 | Gesslein . |
| 3,781,931 | 12/1973 | Patin . |
| 3,848,890 | 11/1974 | MacAlpine . |
| 3,873,116 | 3/1975 | Perego . |
| 3,877,723 | 4/1975 | Fahey et al. . |
| 3,909,043 | 9/1975 | Black . |
| 4,029,329 | 6/1977 | Chambers . |
| 4,064,957 | 12/1977 | Parham . |
| 4,072,318 | 2/1978 | Laune . |
| 4,166,630 | 9/1979 | Sullivan et al. . |
| 4,181,317 | 1/1980 | Toda . |
| 4,325,449 | 4/1982 | D-Addio et al. . |
| 4,335,900 | 6/1982 | Fleischer . |
| 4,346,912 | 8/1982 | Habib . |
| 4,353,567 | 10/1982 | Weldy . |
| 4,361,338 | 11/1982 | Kuchenbecker et al. . |
| 4,369,987 | 1/1983 | Witherell . |
| 4,373,740 | 2/1983 | Hendrix . |
| 4,403,673 | 9/1983 | Ball . |
| 4,408,776 | 10/1983 | Randolph et al. . |

(List continued on next page.)

FOREIGN PATENT DOCUMENTS

| 2579544 | 10/1986 | France . |
| 213538 | 9/1909 | Germany . |
| 2348716 | 7/1974 | Germany . |
| 2741543 | 6/1978 | Germany . |
| 851163 | 10/1960 | United Kingdom . |
| 2099765A | 12/1982 | United Kingdom . |
| 2204282A | 11/1988 | United Kingdom . |

*Primary Examiner*—Brian L. Johnson
*Attorney, Agent, or Firm*—Palmatier, Sjoquist & Helget

[57] ABSTRACT

An infant stroller convertible to an infant trailer towable behind a cycle includes a tubular frame having a lower frame portion and an upper frame portion. The upper frame portion supports a flexible infant holder or seat. With the front wheel removed, the stroller becomes a trailer when connected to a cycle by a quick release trailer-cycle hitch assembly. The assembly includes a fork plate, yoke portion and bicycle hitch end which safely and securely interconnects the trailer to the bicycle frame.

13 Claims, 5 Drawing Sheets

U.S. PATENT DOCUMENTS

| | | |
|---|---|---|
| 4,422,663 | 12/1983 | Hon . |
| 4,526,390 | 7/1985 | Slolnik . |
| 4,542,915 | 9/1985 | Wheeler, III et al. . |
| 4,586,721 | 5/1986 | Harada et al. . |
| 4,618,184 | 10/1986 | Harvey . |
| 4,632,420 | 12/1986 | Miyagi . |
| 4,756,541 | 7/1988 | Albitre . |
| 4,902,027 | 2/1990 | Skelly . |
| 4,934,728 | 6/1990 | Chen . |
| 4,953,880 | 9/1990 | Sudakoff et al. . |
| 5,029,891 | 7/1991 | Jacobs . |
| 5,039,120 | 8/1991 | Stowe . |
| 5,076,599 | 12/1991 | Lockett et al. . |
| 5,123,670 | 6/1992 | Chen . |
| 5,176,395 | 1/1993 | Garforth-Bles . |
| 5,188,389 | 2/1993 | Baechler et al. ............... 280/62 X |
| 5,259,634 | 11/1993 | Berner et al. ..................... 280/204 |
| 5,318,318 | 6/1994 | Berner et al. ..................... 280/204 |

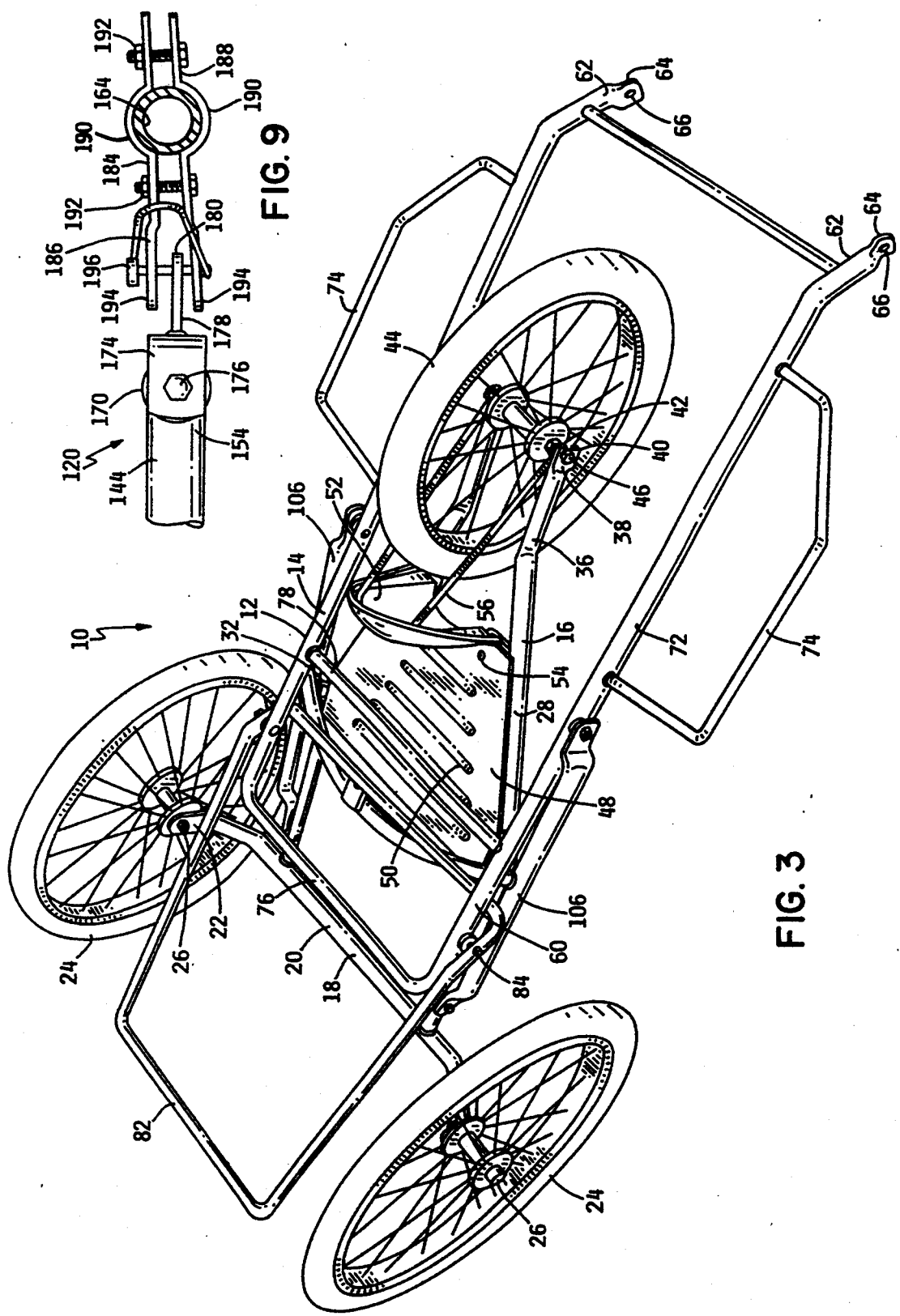

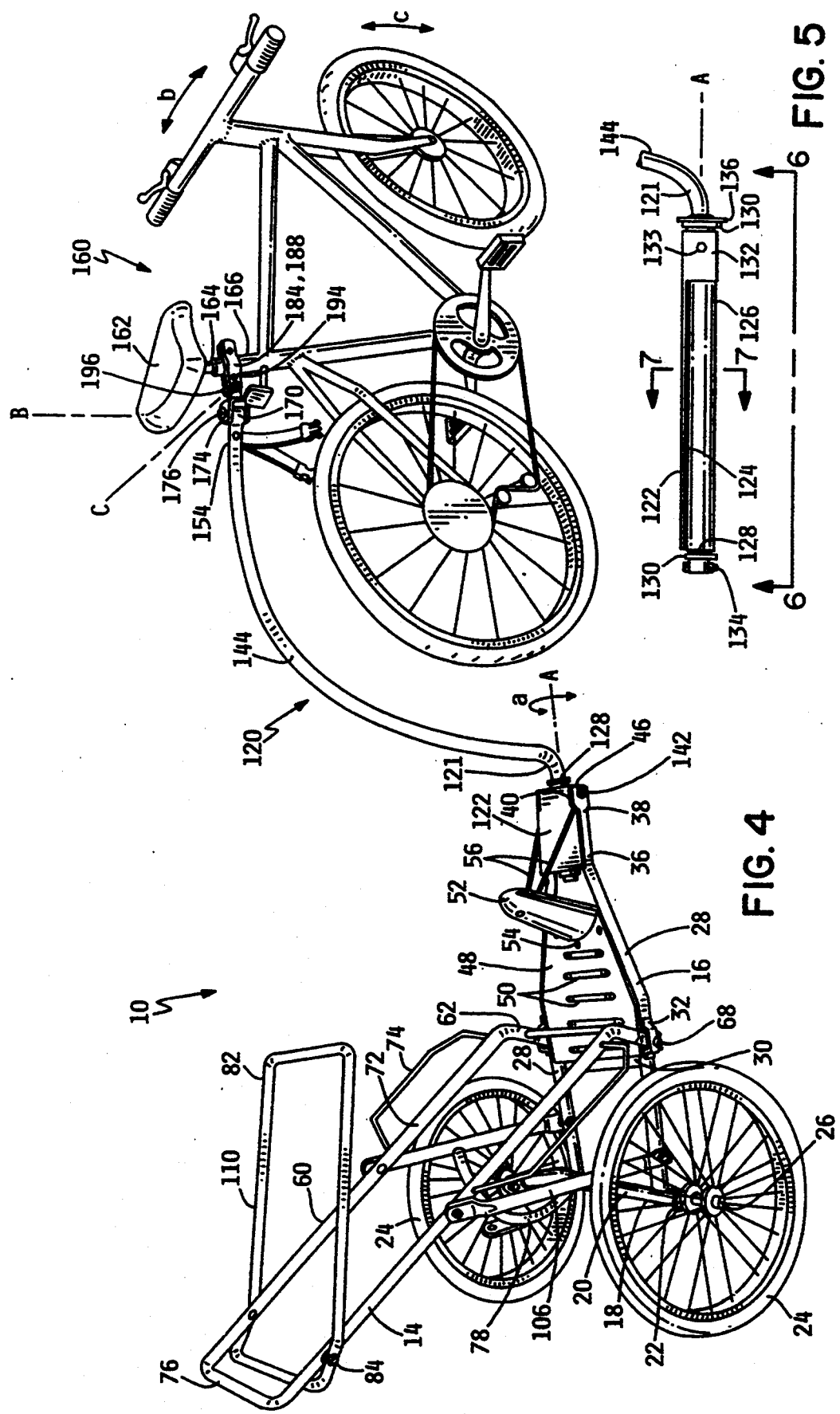

CONVERTIBLE INFANT STROLLER AND TRAILER WITH QUICK RELEASE HITCH

This application is a continuation-in-part of U.S. application Ser. No. 08/102,088, filed Aug. 4, 1993, now U.S. Pat. No. 5,318,318 which is a continuation of Ser. No. 07/992,830, filed Dec. 18, 1992, now U.S. Pat. No. 5,259,634.

BACKGROUND OF THE INVENTION

This invention relates generally to wheeled infant carriers, and more particularly, to a conveniently transportable, infant stroller for safely and smoothly carrying an infant which is also uniquely convertible to an infant trailer for safely and smoothly carrying the infant pulled behind a cycle, such as a bicycle, with a quick release hitch.

Collapsible or foldable baby carriages for walking have long been known and are generally described in U.S. Pat. Nos. 2,781,225; 3,873,116 and 4,072,318. These early carriages have evolved from more cumbersome rigid carriages, as many carriages are now collapsible or foldable as to make them conveniently transported and stored.

With the resurgence of physical fitness, persons of all ages, including the parents of infants and young children, have developed great interest in all forms of physical exercise, particularly in jogging and walking at relatively high speeds. Infant jogging strollers that fold for transport and/or storage, while yet provide for safe, stable and secure carrying of a child at relatively higher speeds, are generally shown in U.S. Pat. Nos. Des. 297,525; 4,934,728; 4,953,880; Des. 314,885; and 5,029,891.

There is a continued need for a foldable infant jogging stroller which includes all the past known refinements, but further includes the ability to convert to an infant trailer for carrying an infant pulled behind a cycle in a safe and smooth fashion at relatively higher speeds than simple jogging with a quick release hitch.

SUMMARY OF THE INVENTION

An infant stroller convertible to an infant trailer towable behind a cycle includes a tubular frame having a lower frame portion and an upper frame portion. The upper frame portion supports a flexible infant holder or seat. With the front wheel removed, the stroller becomes a trailer when connected to a cycle by a quick release trailer-cycle hitch assembly. The assembly includes a fork plate, yoke portion and bicycle hitch end which safely and securely interconnects the trailer to the bicycle frame.

A principal object and advantage of the present invention is that the trailer-cycle hitch assembly quickly and easily releases without tools and permits pivotal movement thereof along three separate and distinct axes to provide a smooth and safe ride for the infant carried in the trailer at the relatively higher speeds of a bicycle or the like as opposed to walking or jogging.

Another object and advantage of the present invention is that the hitch assembly, which pivots in three axes, will not be turned over should the bicycle or cycle be lain down on its side voluntarily or involuntarily should an accident occur.

Another object and advantage of the present invention is that the conveniently transportable and foldable infant stroller readily converts into a trailer of a durable design with minimum usage of parts and with improved strength over the prior known strollers.

Further objects, features and advantages of the present invention will become understood with reference to the following specification, the appended drawings and the claims.

BRIEF DESCRIPTION OF THE DRAWINGS

FIG. 3 is a perspective view of the infant stroller in its folded condition with the infant holder removed for clarity and ready for storage or transportation;

FIG. 4 is a perspective view of the infant stroller converted into an infant trailer connected to a bicycle by the trailer-bicycle hitch assembly;

FIG. 5 is a side elevational view of the trailer attachment end broken away from the remainder of the hitch assembly;

FIG. 9 is a top plan view taken along lines 9—9 of FIG. 8;

DETAILED SPECIFICATION

Figure 1:
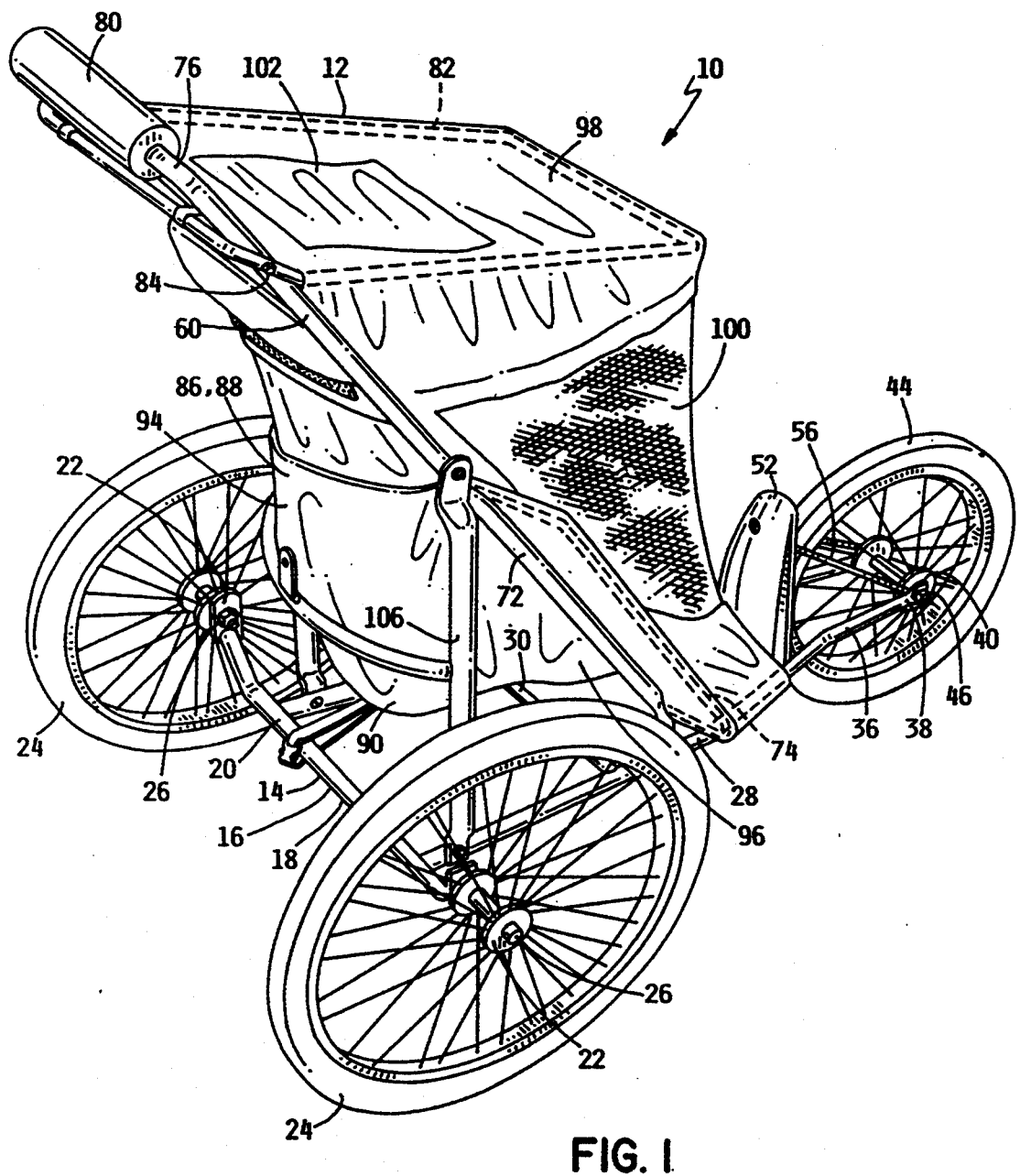
FIG. 1 is a perspective view of the infant stroller in its upright fully assembled condition for use.
Figure 8:
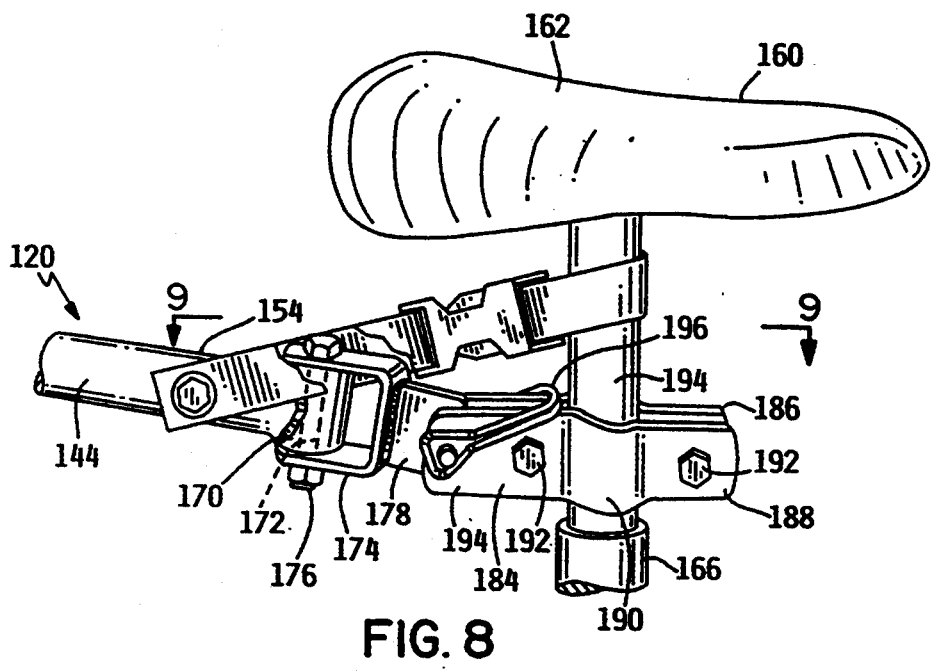
FIG. 8 is an elevational view of the bicycle hitch end of the hitch assembly partially broken away and attached to the vertical bicycle frame portion which is also broken away.
Figure 2:
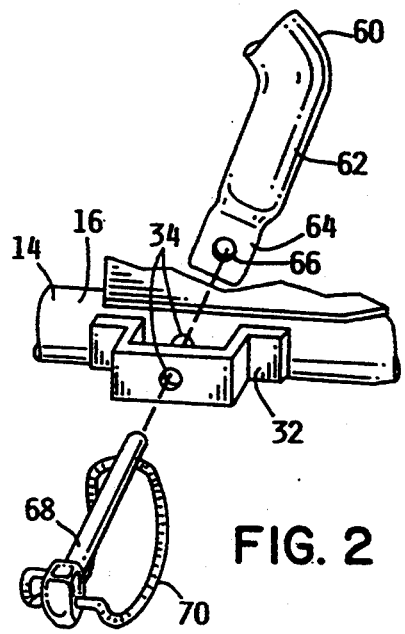
FIG. 2 is a side elevational view of the connectable upper frame portion lower free ends and the lower frame portion mounting brackets partially broken away.
Figure 7:
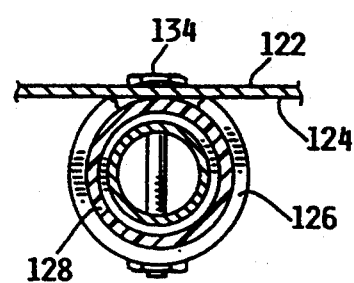
FIG. 7 is a cross-sectional view taken along lines 7—7 of FIGS. 5 and 6.

The convertible infant stroller/trailer 10 in its infant stroller 12 condition may generally be seen in FIGS. 1-3. The stroller 12 is comprised of a tubular frame 14 having a lower frame portion 16 and an upper frame portion 60. The upper frame portion 60 supports a flexible infant holder 86. The infant trailer 110 is generally shown in FIG. 4 which generally comprises the infant stroller 12 with the front wheel 44 removed. FIGS. 4-9 show the trailer-cycle (or bicycle) hitch assembly 120 of the invention.

Referring specifically to FIGS. 1-4, the convertible infant stroller and trailer 10 is generally made from a tubular frame 14. Frame 14 has a lower frame portion 16 substantially parallel to the ground. The lower frame portion 16 has a read end 18 with a rear cross member 20. Directed upwardly from the rear cross member 20 at is distal ends are upwardly directed tongues, tabs or ears 22 with apertures therethrough. At tongues 22 are located rear wheels 24 which are rotatably fixed thereat by axle, bolt and nut arrangements 26 which may also be "drop out axles" as is commonly known.

Extending forwardly from the rear end 18 are converging side rails or legs 28 which are suitably held in alignment by intermediate cross member 30. Adjacent the intermediate cross member 30 along the side rails 28 are located upper frame mounting brackets 32 suitably with apertures 34 through the brackets and side rails 28. Extending forwardly along the side rails 28 is the front end 36 where the rails 28 converge to form fork 38.

Fork 38 at its forward ends have tongues, tabs or ears 40 suitably with forwardly directed slots 42 therein. At slots 42 is positioned the front wheel 44 which is appropriately held in the fork 38 by way of an axle, bolt and nut arrangement 46 suitably affixing the front wheel 44 at the tabs 40.

At the front end 36 of the lower frame portion 16 is located a step plate 48. The step plate 48 appropriately has a non-slip surface 50 which may be by way of corrugation, dimpling or some non-slip coating as to assure that the child or infant does not slip when entering or leaving the infant stroller/trailer 10. Also, on the front end 36 is a wrap around fender 52, which is supported on the step plate 48 by way of screws 54 or the like and fender brackets 56.

The upper frame portion 60 is generally an inverted U-shaped design and has downwardly turned lower free ends 62. At lower ends 62 are located lower frame mounting tongues, tabs or ears 64 which appropriately have apertures 66. With the tabs 64 of the lower free ends 62 inserted into the upper frame mounting brackets 32 of the lower frame portion 16, releasable locking pins 68 are inserted through apertures 66 and 34 after which retainers 70 secure the position of pins 68.

Upwardly along the upper frame portion 60 is located intermediate seat portion 72 which has outwardly directed wing-like safety fenders or arm rest supports 74. Further upwardly, is located upper handle end 76 which has a cross connecting seat bar 78 and a foam grip 80 for the operator to grasp. Directed forwardly from the upper handle end 76 is located a rectangular awning or sunshade frame 82 which is connected to the upper handle end 76 at pivotal mounting points 84.

Draped over the intermediate seat portion 72 is a flexible infant holder 86 which may be comprised of flexible soft fabric-like seat material 88 which forms a seat 90, back rest 94 and side walls 96. An awning 98 may be supported over the awning frame 82. Suspended therefrom may be a front screen 100 with an access window 102 in the awning 98. Pivotally connecting the upper frame portion 60 and the lower frame portion 16 are vertical support brackets 106.

Specifically referring to FIGS. 1–3, the operation collapsing and setting up the infant stroller 12 may be seen. More specifically, the retainer 70 may be moved out of the way to permit locking pins 68 to be removed. Thereafter, the lower free ends 62 of the upper frame portion 60 are lifted out of mounting brackets 32 and moved forwardly. The pivotal movement of the vertical support brackets 106 connecting the upper frame portion 60 and the lower frame portion 16 permits the stroller 12 to have the upper frame portion 60 folded down upon the lower frame portion 16 for easy transportation or storage of the unit.

Referring to FIGS. 4–9, the trailer 110 and trailer-cycle hitch assembly 120 connected to a bicycle 160 may be seen. The trailer-cycle hitch assembly 120 pivots in three unique axes designated by letters A, B and C. The A axis is substantially horizontal and through the trailer 110 and bicycle 160. The B axis is substantially vertical and through the bicycle hitch end 154 of the hitch assembly 120. The C axis is substantially horizontal and perpendicular to the A axis, as it also passes through the bicycle hitch end 154.

The hitch assembly 120 has a trailer attachment end 121 which supports fork plate 122. Fork plate 122 has an underside 124 whereat tubular collar 126 is appropriately welded thereto. Within collar 126 is located a plastic sleeve or bushing 128 which appropriately has shoulders 130 at its distal ends to secure the bushing 128 within collar 126. The fork plate 122 has located rearwardly and downwardly turned ears 132 with apertures 133 therethrough. A bolt and nut arrangement 134 appropriately secures the horizontal portion of the trailer attachment end 121 of the hitch assembly 120 within the plastic bushing 128 as to prevent its removal. A shoulder ring 136 is located inwardly from the trailer attachment end 121 as to prevent the fork plate assembly 122 from being moved forwardly.

Figure 6:
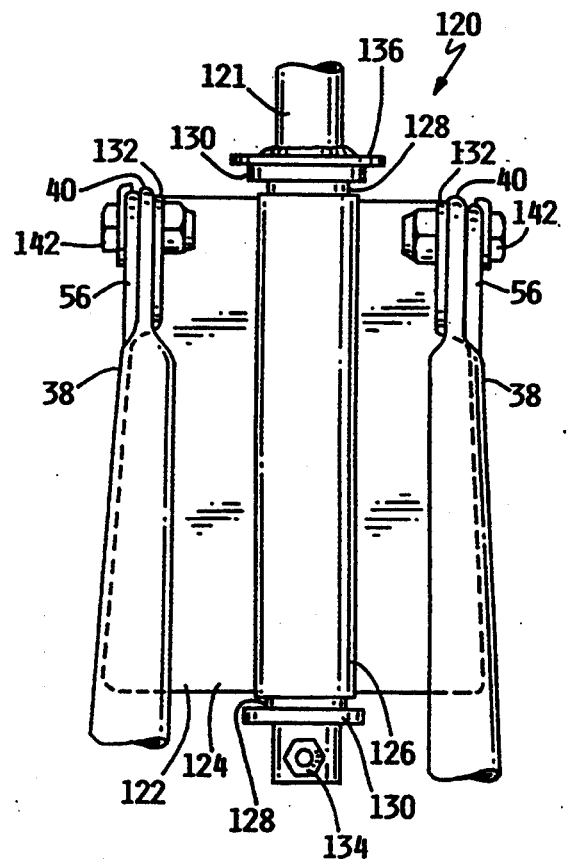
FIG. 6 is a bottom plan view of the trailer attachment end of the hitch assembly as if taken along lines 6—6 of FIG. 5.

As can be seen in FIGS. 4 and 6, the tongues or tabs 40 of fork 38 of the lower frame portion 16 are appropriately aligned with the downwardly turned ears 132 of the fork plate 122. Nuts and bolts 142 appropriately pass through the apertures 133 of the ears 132 and the slots 42 of the fork 38. The hitch assembly 120 at the trailer attachment end 122 is further rigidified and structurally supported by the action of the fork 38 supporting the underside 124 of the fork plate 122. By this arrangement, the hitch assembly 120 will take considerable tongue weight at the trailer attachment end 121 as a safety factor while yet permitting pivotal movement along axis A as will be appreciated hereinafter.

Extending upwardly in an arcuate manner from trailer attachment end 121 is located a yoke portion 144 of the hitch assembly 120. This particular portion may be referred to as the arcuate intermediate portion 152 which ends at bicycle hitch end 154. The yoke portion 144 and arcuate intermediate portion 152 are formed as to pass over the rear wheel of a bicycle or cycle 160.

Bicycle 160 typically includes a seat portion 162 with a seat stem 164 thereunder which interlockably telescopes within a vertical bicycle frame portion 166. This arrangement permits seat 162 to be adjusted vertically for the suitable height of the operator.

At the bicycle hitch end 154 of the hitch assembly is located an enlarged solid end 170 with a vertical aperture 172 therethrough which is common with axis B. Extending above and below the enlarged solid end 170 is a U-shaped bracket 174 which is pivotally secured to the end 170 by a nut, bolt and bushing arrangement 176. The U-shaped bracket 174 also supports a forwardly directed ear 178 with an aperture 180 therethrough.

Attachable to either the seat stem 164 or the vertical bicycle frame portion 166 is located a bicycle frame or stem clamp 184 which is made from mirror imaged first and second pieces 186 and 188. Pieces 186 and 188 have curved portions 190 to mate with the stem 164 or bicycle frame 166. Bolts and nuts 192 pass through clamp pieces 186 and 188 adjacent the curve portions 190 as to secure the clamp 184 to the bicycle 160.

Extending rearwardly on clamp 184 from pieces 186 and 188 are rearwardly directed tabs which appropriately receive a pin 196 with a position retainer. By this arrangement, the bicycle clamp 184 may be releasably secure the bicycle hitch end 154 of the hitch assembly 120 and yoke 144. It is also appropriate to know that axis C passes through a pin 196.

The attachment of the trailer-cycle hitch assembly 120 to the trailer 110 and bicycle 160 may now be understood. The operation of the smooth, safe and relatively high speed movement of the bicycle 160 and the trailer 110 will be appreciated.

As bicycle 160 moves upwardly and downwardly over bumps, curbs and holes, as illustrated by arrow designated by "C", the trailer 110 remains steady as the hitch assembly 120 pivots along axis C. As the operator of the bicycle turns the bicycle 160 to the left or right, as illustrated by arrow designated "B", the trailer 110 smoothly follows as the hitch assembly 120 pivots along axis B. Should the operator of the bicycle either voluntarily or involuntarily be forced to lay the bicycle down on its side due to an emergency or accident, as illustrated by arrow designated by "A", the hitch assembly 120 pivots along the A axis to permit the trailer 110 to remain in its upright condition.

Should the operator wish to detach the trailer 110 and hitch assembly 120 from the bicycle 160, pin 196 with its position retainer is simply removed. To convert the trailer 110 back to the stroller 12 condition, the nuts and bolts 142 are removed and replaced by the front wheel 44 and axle arrangement 146. At any time the lower free ends 162 may be released from the mounting brackets 32 as to fold the unit substantially flat and parallel to the ground for storage or transportation.

Figure 10:
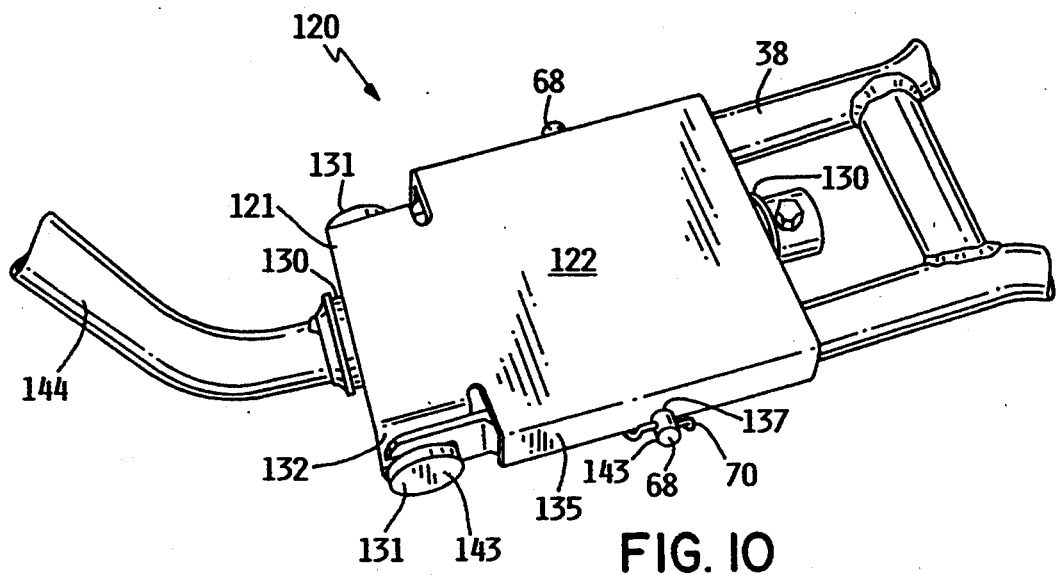
FIG. 10 is a perspective view of the quick release trailer-cycle hitch assembly partially broken away.
Figure 11:
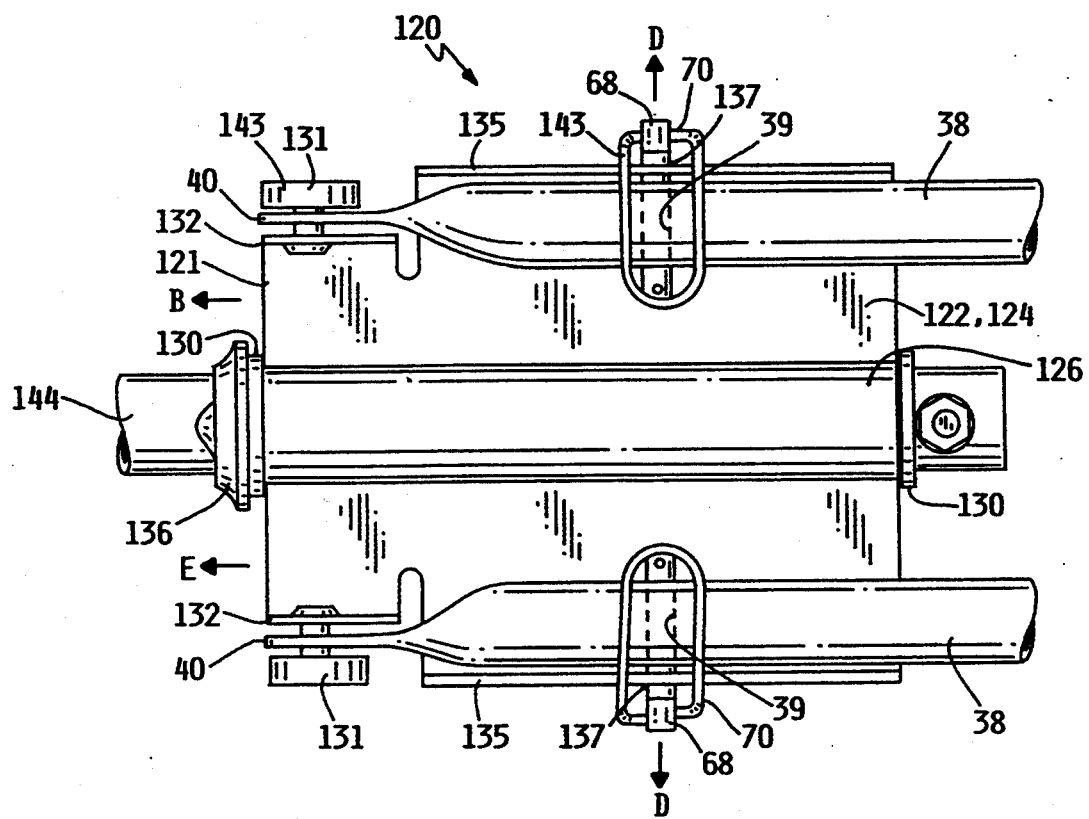
FIG. 11 is a bottom plan view of the quick release trailer-cycle hitch assembly of FIG. 10.

FIGS. 10 and 11 show a quick release means 143 for securing the tailer attachment end 121 to the front fork end 38. Means 143 generally includes the combination of fork pins with heads 131 extending outwardly from ears 132 on plate 122. Pins 131 are engageable with the slots of fork tabs 40. Next, the apertures 39 in fork 38 are aligned with apertures 137 on flanges 135. Thereafter, quick release locking pins 68 are inserted in the aligned aperture 39 and 137 and secured with retainers 70.

Disconnection of the quick release means 143 involves removing pins 68 (arrow D) and pulling the trailer attachment end 121 forwardly and away from the fork end 38 (arrow E). Thereafter, front wheel 44 may be put on the fork end 38.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. A conveniently transportable infant stroller with a quick release trailer cycle hitch assembly, the stroller convertible into an infant trailer with a quick release trailer cycle hitch assembly, the stroller for safely and smoothly carrying an infant at walking speed and at a relatively higher speed than the normal average walking speed of approximately 3–4 miles per hour, the stroller being convertible to an infant trailer for safely and smoothly carrying an infant pulled behind a cycle, the convertible infant stroller and trailer with the quick release trailer cycle hitch assembly comprising:
   (a) a frame having an upper frame portion and a lower frame portion, the lower frame portion having a rear end supporting two rear wheels and a front fork end with slotted tabs releasably supporting a front wheel which upon removal of the front wheel converts the stroller into the trailer, the upper frame portion has an upper handle end, an intermediate seat portion supporting an infant holder;
   (b) a trailer cycle hitch assembly having a removable trailer attachment end attachable to the front fork end of the lower frame portion, a yoke portion and a cycle hitch end attachable to a frame portion of the cycle;
   (c) a fork plate attached to the trailer attachment end with an underside which contacts the fork end of the lower frame portion; and
   (d) a quick release means for rigidly securing the fork plate to the fork end.

2. The hitch assembly of claim 1, wherein the hitch assembly is pivotal along first, second and third axes to provide an upright, stable safe ride for the infant in the trailer at relatively higher speeds as the cycle turns left and right, goes over obstacles or is laid down on the ground.

3. The hitch assembly of claim 2, wherein the first axis is substantially horizontal and extends through the cycle and the trailer.

4. The hitch assembly of claim 2, wherein the second axis is substantially vertical and through the cycle hitch end.

5. The hitch assembly of claim 2, wherein the third axis is substantially horizontal and perpendicular to the first axis and to the cycle.

6. The hitch assembly of claim 1, wherein the fork plate further has a collar and bushing with the collar to pivotally receive and capture the yoke portion to permit the trailer to remain upright should the cycle be laid down on the ground.

7. The hitch assembly of claim 1, wherein the cycle hitch end includes a bracket to permit the hitch assembly to pivot along the second and third axes through the bracket.

8. The hitch assembly of claim 7, further comprising a clamp adapted to releasably and securely connect the frame portion of the cycle and to pivotally connect to the bracket along the third axis.

9. The hitch assembly of claim 1, further comprising a safety strap mounted on the hitch assembly at the cycle hitch end for releasably capturing the frame portion of the cycle for added safety.

10. The hitch assembly of claim 1, wherein the quick release means comprises fork pins extending from the plate engageable with slotted tabs at the front fork end.

11. The hitch assembly of claim 1, wherein the quick release means comprises a quick release locking pin releasably engageable with the front fork end and the plate to rigidly support and secure the trailer attachment end to the front fork end.

12. The hitch assembly of claim 1, wherein the quick release means comprises fork pins extending from the plate engageable with slotted tabs at the front fork end and a quick release locking pin releasably engageable with the front fork end and the plate to rigidly support and secure the trailer attachment end to the front fork end.

13. A conveniently transportable infant stroller with a quick release trailer cycle hitch assembly, the stroller convertible into an infant trailer with a quick release trailer cycle hitch assembly, the stroller for safely and smoothly carrying an infant at walking speed and at a relatively higher speed than the normal average walking speed of approximately 3–4 miles per hour, the stroller being convertible to an infant trailer for safely and smoothly carrying an infant pulled behind a cycle, the convertible infant stroller and trailer with the quick release trailer cycle hitch assembly comprising:
   (a) a frame having an upper frame portion and a lower frame portion, the lower frame portion having a rear end supporting two rear wheels and a front fork end with slotted tabs releasably supporting a front wheel which upon removal of the front wheel converts the stroller into the trailer, the upper frame portion has an upper handle end, an intermediate seat portion supporting an infant holder;

(b) a trailer cycle hitch assembly having a removable trailer attachment end attachable to the front fork end of the lower frame portion, a yoke portion and a cycle hitch end attachable to a frame portion of the cycle wherein the hitch assembly is pivotal along first, second and third axes to provide an upright, stable safe ride for the infant in the trailer at relatively higher speeds as the cycle turns left and right, goes over obstacles or is laid down on the ground;

(c) a fork plate attached to the trailer attachment end with an underside which contacts the fork end of the lower frame portion; and (d) a quick release means for rigidly securing the fork plate to the fork end comprising fork pins extending from the plate engageable with slotted tabs at the front fork end and a quick release locking pin releasably engageable with the front fork end and the plate to rigidly support and secure the trailer attachment end to the front fork end.

* * * * *